United States Patent
Makino

(10) Patent No.: US 11,017,945 B2
(45) Date of Patent: May 25, 2021

(54) MULTILAYER CERAMIC CAPACITOR AND MANUFACTURING METHOD OF MULTILAYER CERAMIC CAPACITOR

(71) Applicant: TAIYO YUDEN CO., LTD., Tokyo (JP)

(72) Inventor: Toru Makino, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 85 days.

(21) Appl. No.: 16/274,076

(22) Filed: Feb. 12, 2019

(65) Prior Publication Data

US 2019/0267189 A1   Aug. 29, 2019

(30) Foreign Application Priority Data

Feb. 26, 2018   (JP) .............................. JP2018-031512

(51) Int. Cl.
*H01G 4/012*   (2006.01)
*H01G 4/30*    (2006.01)
*H01G 4/12*    (2006.01)
*H01G 4/008*   (2006.01)

(52) U.S. Cl.
CPC .......... *H01G 4/012* (2013.01); *H01G 4/0085* (2013.01); *H01G 4/1227* (2013.01); *H01G 4/30* (2013.01)

(58) Field of Classification Search
CPC .......... H01G 4/30; H01G 4/005; H01G 4/012; H01G 4/008
See application file for complete search history.

(56) References Cited

U.S. PATENT DOCUMENTS

| | | | | |
|---|---|---|---|---|
| 5,687,055 A | * | 11/1997 | Miki | H01G 4/0085 252/514 |
| 9,418,792 B2 | * | 8/2016 | Konishi | H01G 4/1245 |
| 2008/0090273 A1 | * | 4/2008 | Winkler | C12N 9/93 435/145 |
| 2012/0162855 A1 | * | 6/2012 | Suh | H01B 1/22 361/305 |
| 2013/0279074 A1 | * | 10/2013 | Lee | H01G 4/012 361/321.2 |

FOREIGN PATENT DOCUMENTS

JP   2007173714 A  *  7/2007
JP    201457098 A     3/2014

* cited by examiner

*Primary Examiner* — Eric W Thomas
(74) *Attorney, Agent, or Firm* — Law Office of Katsuhiro Arai

(57) ABSTRACT

A multilayer ceramic capacitor includes: a multilayer structure in which each of a plurality of dielectric layers and each of a plurality of internal electrode layers are alternately stacked, a main component of the dielectric layers being ceramic, a main component of the internal electrode layer being a metal, wherein an arithmetic average roughness Ra of at least a part of the internal electrode layer is 30 nm or less, wherein a maximum height Rz of the at least a part of the internal electrode layer is 360 nm or less.

11 Claims, 8 Drawing Sheets

FIG. 3

| | MAIN COMPONENT METAL | | | CO-MATERIAL | | | |
|---|---|---|---|---|---|---|---|
| | AVERAGE GRAIN DIAMETER [nm] | STANDARD DEVIATION | INCLINATION OF ACCUMULATED GRAIN SIZE DISTRIBUTION | AVERAGE GRAIN DIAMETER [nm] | STANDARD DEVIATION | INCLINATION OF ACCUMULATED GRAIN SIZE DISTRIBUTION | ADDED AMOUNT (WEIGHT PART) |
| EXAMPLE 1 | 70 | 12 | 8 | 8.6 | 2.7 | 7 | 2.5 |
| EXAMPLE 2 | 70 | 12 | 8 | 8.6 | 2.7 | 7 | 5 |
| EXAMPLE 3 | 70 | 12 | 8 | 8.6 | 2.7 | 7 | 10 |
| EXAMPLE 4 | 70 | 12 | 8 | 8.6 | 2.7 | 7 | 20 |
| EXAMPLE 5 | 70 | 12 | 8 | 8.6 | 2.7 | 7 | 25 |
| COMPARATIVE EXAMPLE 1 | 70 | 12 | 8 | 29 | 8.7 | 5 | 2.5 |
| COMPARATIVE EXAMPLE 2 | 70 | 12 | 8 | 29 | 8.7 | 5 | 5 |
| COMPARATIVE EXAMPLE 3 | 70 | 12 | 8 | 29 | 8.7 | 5 | 10 |
| COMPARATIVE EXAMPLE 4 | 70 | 12 | 8 | 29 | 8.7 | 5 | 20 |
| COMPARATIVE EXAMPLE 5 | 70 | 12 | 8 | 29 | 8.7 | 5 | 25 |
| COMPARATIVE EXAMPLE 6 | 120 | 33 | 6 | 29 | 8.7 | 5 | 2.5 |
| COMPARATIVE EXAMPLE 7 | 120 | 33 | 6 | 29 | 8.7 | 5 | 5 |
| COMPARATIVE EXAMPLE 8 | 120 | 33 | 6 | 29 | 8.7 | 5 | 10 |
| COMPARATIVE EXAMPLE 9 | 120 | 33 | 6 | 29 | 8.7 | 5 | 20 |
| COMPARATIVE EXAMPLE 10 | 120 | 33 | 6 | 29 | 8.7 | 5 | 25 |

FIG. 5

| | AVERAGE GRAIN DIAMETER OF MAIN COMPONENT METAL [nm] | AVERAGE GRAIN DIAMETER OF CO-MATERIAL [nm] | ADDED AMOUNT OF CO-MATERIAL (WEIGHT PART) | Ra[nm] | Rz[nm] | CAPACITY [μF] | BDV [V] | HALT [min] |
|---|---|---|---|---|---|---|---|---|
| EXAMPLE 1 | 70 | 8.6 | 2.5 | 28 | 357 | 19.8 | 42 | 305 |
| EXAMPLE 2 | 70 | 8.6 | 5 | 25 | 148 | 21.8 | 55 | 384 |
| EXAMPLE 3 | 70 | 8.6 | 10 | 22 | 134 | 21.7 | 54 | 384 |
| EXAMPLE 4 | 70 | 8.6 | 20 | 21 | 122 | 22.1 | 52 | 396 |
| EXAMPLE 5 | 70 | 8.6 | 25 | 27 | 327 | 19.2 | 39 | 312 |
| COMPARATIVE EXAMPLE 1 | 70 | 29 | 2.5 | 37 | 612 | 17.3 | 30 | 232 |
| COMPARATIVE EXAMPLE 2 | 70 | 29 | 5 | 32 | 554 | 18.4 | 36 | 278 |
| COMPARATIVE EXAMPLE 3 | 70 | 29 | 10 | 32 | 542 | 18.5 | 35 | 283 |
| COMPARATIVE EXAMPLE 4 | 70 | 29 | 20 | 31 | 533 | 18.7 | 36 | 281 |
| COMPARATIVE EXAMPLE 5 | 70 | 29 | 25 | 36 | 587 | 17.6 | 31 | 257 |
| COMPARATIVE EXAMPLE 6 | 120 | 29 | 2.5 | 46 | 775 | 13.2 | 24 | 124 |
| COMPARATIVE EXAMPLE 7 | 120 | 29 | 5 | 42 | 712 | 14.6 | 27 | 154 |
| COMPARATIVE EXAMPLE 8 | 120 | 29 | 10 | 41 | 720 | 14.8 | 27 | 164 |
| COMPARATIVE EXAMPLE 9 | 120 | 29 | 20 | 41 | 713 | 14.9 | 26 | 158 |
| COMPARATIVE EXAMPLE 10 | 120 | 29 | 25 | 43 | 743 | 14.6 | 27 | 162 |

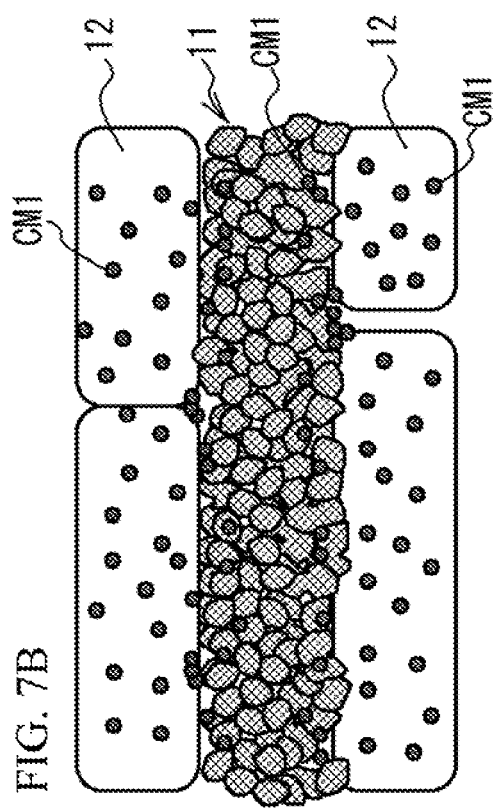
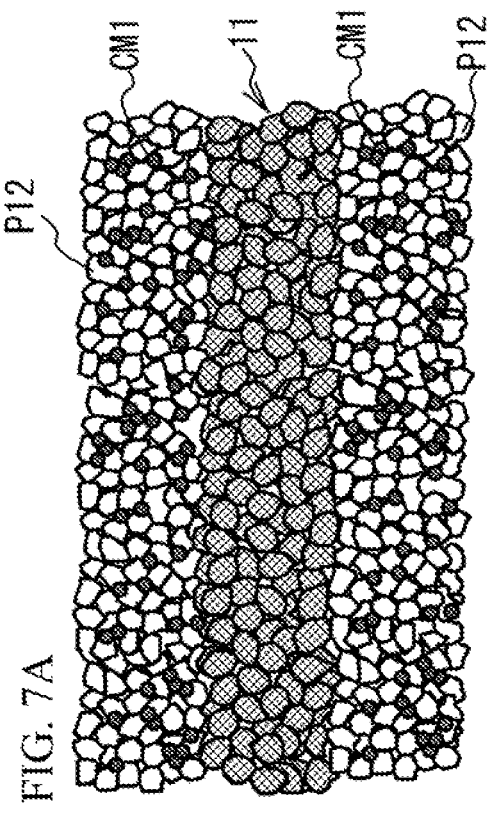
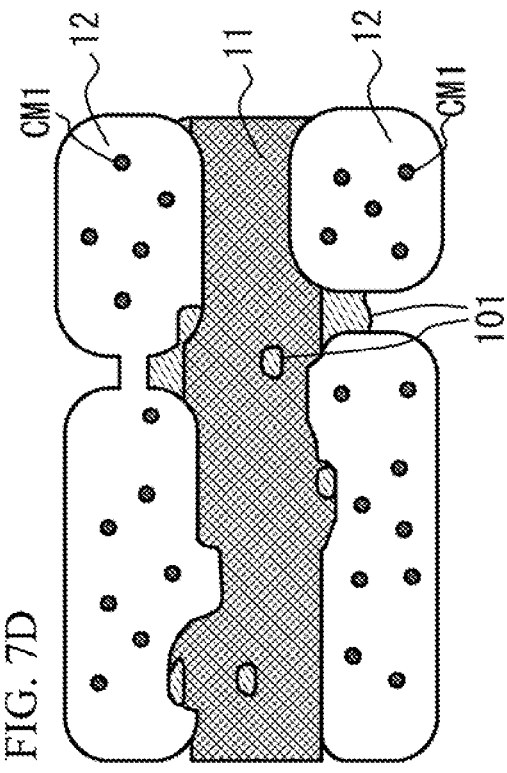
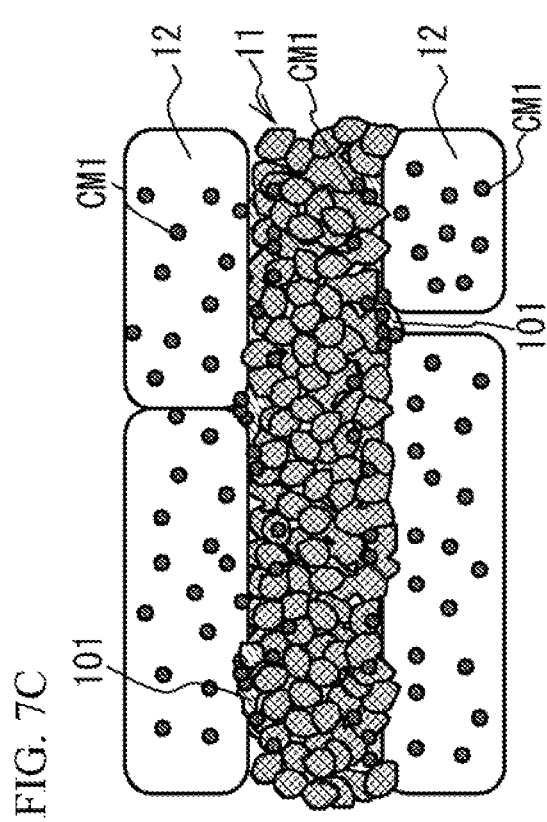

MULTILAYER CERAMIC CAPACITOR AND MANUFACTURING METHOD OF MULTILAYER CERAMIC CAPACITOR

CROSS-REFERENCE TO RELATED APPLICATION

This application is based upon and claims the benefit of priority of the prior Japanese Patent Application No. 2018-031512, filed on Feb. 26, 2018, the entire contents of which are incorporated herein by reference.

FIELD

A certain aspect of the present invention relates to a multilayer ceramic capacitor and a manufacturing method of a multilayer ceramic capacitor.

BACKGROUND

Recently, electronic devices such as smart phones or mobile phones are being downsized. Thereby, electronic components mounted on the electronic devices are rapidly being downsized. For example, in a field of multilayer ceramic capacitors, although property is secured, thicknesses of dielectric layers and internal electrode layers are reduced in order to reduce a chip size (for example, see Japanese Patent Application Publication No. 2014-57098).

SUMMARY OF THE INVENTION

A continuity modulus of an internal electrode after sintering is reduced because of a difference between a sintering start temperature of a metal of the internal electrode layer and a sintering start temperature of ceramic of a dielectric layer. Therefore, a co-material of ceramic is added to the internal electrode layer in order to delay contraction of the internal electrode layer. However, when a thickness of the internal electrode layer is reduced, the co-material tends to be extruded to the dielectric layer side. Thereby, surface roughness of the internal electrode layer may be enlarged. Therefore, a thickness of the internal electrode layer becomes uneven in a stacking direction of the dielectric layer and the internal electrode layer. When the thickness of the internal electrode layer in uneven, a liquid phase tends to be flocculated in an interface between the internal electrode layer and the dielectric layer in a region of the internal electrode layer of which a thickness is small. And reliability may be degraded.

The present invention has a purpose of providing a multilayer ceramic capacitor and a manufacturing method of a multilayer ceramic capacitor that are capable of suppressing degradation of reliability.

According to an aspect of the present invention, there is provided a multilayer ceramic capacitor including: a multilayer structure in which each of a plurality of dielectric layers and each of a plurality of internal electrode layers are alternately stacked, a main component of the dielectric layers being ceramic, a main component of the internal electrode layer being a metal, wherein an arithmetic average roughness Ra of at least a part of the internal electrode layer is 30 nm or less, wherein a maximum height Rz of the at least a part of the internal electrode layer is 360 nm or less.

According to another aspect of the present invention, there is provided a manufacturing method of a multilayer ceramic capacitor including: a first step of forming a pattern of a metal conductive paste on a green sheet including ceramic powder, a main component of the metal conductive paste being metal powder of which an average grain diameter is 100 nm or less and of which a standard deviation of grain size distribution is 15 or less, the metal conductive paste including ceramic powder as a co-material, an average grain diameter of the co-material being less than 10 nm, a standard deviation of grain size distribution of the co-material being 5 or less, an amount of the co-material being 2.5 weight part or more and 25 weight part or less with respect to 100 weight part of the metal powder; and a second step of firing a ceramic multilayer structure in which a plurality of multilayer units obtained in the first step are stacked, wherein an arithmetic average roughness Ra of at least a part of an internal electrode formed by sintering of the metal powder in the second step is 30 nm or less, wherein a maximum height Rz of the at least a part of the internal electrode layer is 360 nm or less.

BRIEF DESCRIPTION OF THE DRAWINGS

FIG. 3 illustrates average grain diameters, standard deviations, inclinations of accumulated grain size distribution and an added amount of a co-material of conductive paste for forming an internal electrode layer of examples and comparative examples;

FIG. 5 illustrates an arithmetic average roughness Ra, a maximum height Rz of an internal electrode layer, a capacity, a breakdown voltage (BDV) and a high temperature accelerated life time (HALT) of multilayer ceramic capacitors of examples and comparative examples;

FIG. 7A to FIG. 7D illustrate conditions of dielectric layers and internal electrode layers from after removing of a binder to after densifying, in a comparative example 3.

DETAILED DESCRIPTION

A description will be given of an embodiment with reference to the accompanying drawings.

EMBODIMENT

Figure 1:
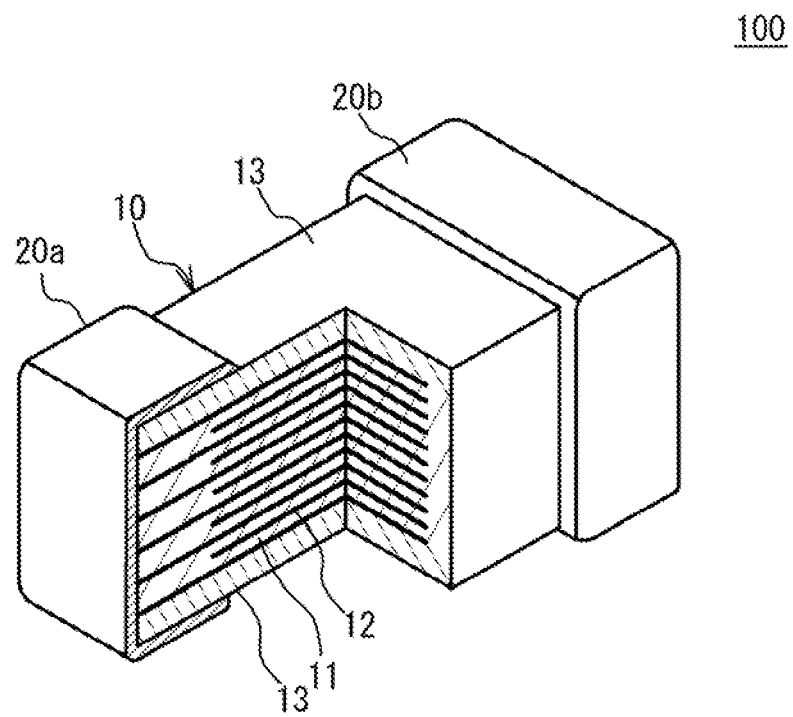
FIG. 1 illustrates a partial perspective view of a multilayer ceramic capacitor.

FIG. 1 illustrates a partial perspective view of a multilayer ceramic capacitor 100 in accordance with an embodiment. As illustrated in FIG. 1, the multilayer ceramic capacitor 100 includes a multilayer chip 10 having a rectangular parallelepiped shape, and a pair of external electrodes 20a and 20b that are respectively provided at two edge faces of the multilayer chip 10 facing each other. In four faces other than the two edge faces of the multilayer chip 10, two faces other than an upper face and a lower face of the multilayer chip 10 in a stacking direction are referred to as side faces. The external electrodes 20a and 20b extend to the upper face, the lower face and the two side faces. However, the external electrodes 20a and 20b are spaced from each other.

The multilayer chip 10 has a structure designed to have dielectric layers 11 and internal electrode layers 12 alternately stacked. A main component of the dielectric layer 11 is a ceramic material acting as a dielectric material. A main component of the internal electrode layers 12 is a metal material such as a base metal material. End edges of the internal electrode layers 12 are alternately exposed to a first edge face of the multilayer chip 10 and a second edge face of the multilayer chip 10 that is different from the first edge face. In the embodiment, the first face faces with the second face. The external electrode 20a is provided on the first edge face. The external electrode 20b is provided on the second edge face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, the internal electrode layer 12 is positioned at an outermost layer in the stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 2.0 mm, a width of 1.25 mm and a height of 1.25 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. A thickness of the internal electrode layer 12 is, for example, 0.5 μm or less. It is preferable that the thickness of the internal electrode layer 12 is 0.3 μm or less. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

For the purpose of downsizing the multilayer ceramic capacitor 100 and enlarging the capacity of the multilayer ceramic capacitor 100, reduction of the thicknesses of the dielectric layer 11 and the internal electrode layer 12 is required. There is a problem that a continuity modulus of the internal electrode layer 12 after sintering is reduced, because a sintering start temperature of the metal of the internal electrode layer 12 is different from that of the ceramic of the dielectric layer 11. Therefore, a co-material of ceramic is added to the internal electrode layer 12 in order to delay contraction of the internal electrode layer 12. However, when the internal electrode layer 12 is thin, the co-material tends to be extruded to the dielectric layer 11 side. In this case, surface roughness of the internal electrode layer 12 may become larger. Therefore, the thickness of the internal electrode layer 12 becomes uneven in the stacking direction of the dielectric layer 11 and the internal electrode layer 12. When the thickness of the internal electrode layer 12 is uneven, a liquid phase tends to be flocculated into an interface between the internal electrode layer 12 and the dielectric layer 11, in a part of the internal electrode layer 12 of which the thickness is small. In this case, the reliability of the multilayer ceramic capacitor 100 may be degraded.

And so, in the embodiment, the surface roughness of the internal electrode layer 12 is reduced. In concrete, an arithmetic average roughness Ra of the internal electrode layer 12 is 30 nm or less, and a maximum height Rz of the internal electrode layer 12 is 360 nm or less. The arithmetic average roughness Ra and the maximum height Rz are defined in JIS B 0601:2013. It is preferable that the arithmetic average roughness Ra is 25 nm or less. It is preferable that the maximum height Rx is 150 nm or less. With the structure, unevenness of the thickness of the internal electrode layer 12 is suppressed. Thereby, the continuity modulus of the internal electrode layer 12 gets higher. In this case, the flocculation of the liquid phase into the interface between the dielectric layer 11 and the internal electrode layer 12 is suppressed. Therefore, the degradation of the reliability is suppressed, and desirable characteristic may be achieved. When the average thickness of the internal electrode layer 12 is 0.5 μm or less, the co-material tends to be extruded to the dielectric layer 11. Therefore, the structure of the embodiment is effective when the average thickness of the internal electrode layer 12 is 0.5 μm or less.

Figure 2:
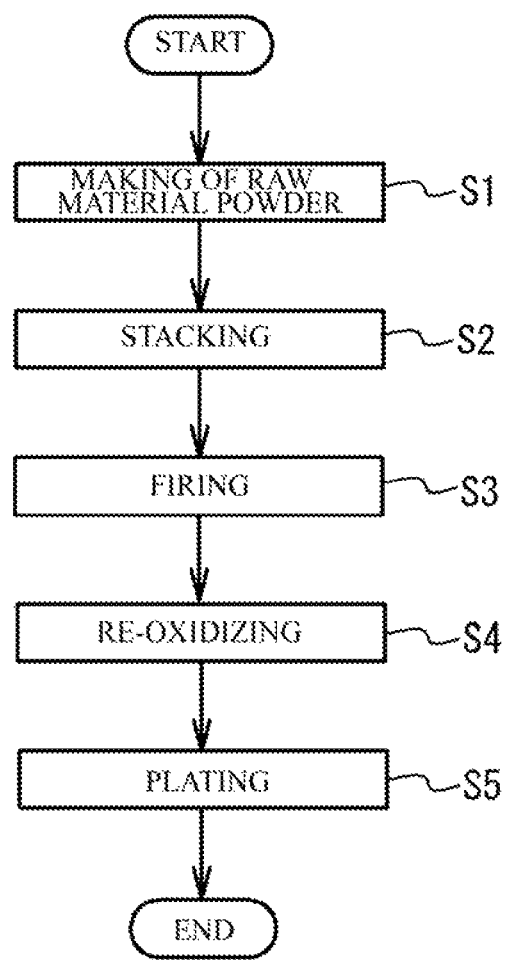
FIG. 2 illustrates a manufacturing method of a multilayer ceramic capacitor.

Next, a description will be given of a manufacturing method of the multilayer ceramic capacitor 100. FIG. 2 illustrates a manufacturing method of the multilayer ceramic capacitor 100.

(Making process of a raw material powder) As illustrated in FIG. 2, a dielectric material for forming the dielectric layer 11 is prepared. An A site element and a B site element of the dielectric layer 11 are generally included in the dielectric layer 11 in a shape of sintered structure of grains of $ABO_3$. For example, $BaTiO_3$ is tetragonal compound having a perovskite structure and has a high dielectric constant. $BaTiO_3$ can be obtained by reacting a titanium material such as titanium dioxide with a barium material such as barium carbonate and synthesizing barium titanate. Various methods are known as a synthesizing ceramic of the dielectric layer 11. For example, a solid-phase method, a sol-gel method, a hydrothermal method and so on are known. In the embodiment, any one of them can be adopted.

Next, additive compound may be added to a ceramic powder material, in accordance with purposes. The additive compound may be an oxide of Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni (nickel), Li (lithium), B (boron), Na (sodium), K (potassium) and Si (silicon), or glass.

In the embodiment, it is preferable that compound including additive compound is mixed with the ceramic grains structuring the dielectric layer 11. The resulting ceramic grains with the additive compound are calcined within a temperature range of 820 degrees C. to 1150 degrees C.

Then, the ceramic grains are wet-blended with the additive compound. After that, the ceramic grains with the additive compound are dried and crushed. And, desirable ceramic powder is prepared. For example, it is preferable that an average grain diameter of the ceramic powder is 50 nm to 300 nm from a viewpoint of reducing the thickness of the dielectric layer 11. For example, the grain diameter of the resulting ceramic may be adjusted by crushing the resulting ceramic powder. Alternatively, the grain diameter may be adjusted by performing the crushing and a classifying process.

(Stacking Process) Next, a binder such as polyvinyl butyral (PVB) resin, an organic solvent such as ethanol or toluene, and a plasticizer such as dioctyl phthalate (DOP) are added to the resulting dielectric material and wet-blended. With use of the resulting slurry, a strip-shaped dielectric green sheet with a thickness of 0.8 μm or less is coated on a base material by, for example, a die coater method or a doctor blade method, and then dried.

Then, a pattern of the internal electrode layer 12 is provided on the surface of the dielectric green sheet by printing a conductive paste for forming an internal electrode layer with use of screen printing or gravure printing. The conductive paste includes an organic binder. Thus, internal electrode layer patterns that are alternately extracted to the pair of external electrodes are provided. A metal material of the metal conductive paste has an average grain diameter of 100 nm or less. A standard deviation of the grain diameter is 15 or less. In this case, sharp grain size distribution is obtained. It is preferable that the average grain diameter is 100 nm or less. It is more preferable that the average grain diameter is 70 nm or less. It is preferable that a maximum grain diameter is 140 nm or less. This is because when a metal material of which a grain diameter is more than 140 nm is mixed, the surface roughness of the internal electrode layer 12 may be degraded because of the large grain diameter. It is preferable that the standard deviation of the grain diameter is 15 or less. It is more preferable that the standard deviation of the grain diameter is 12 or less. An inclination of accumulated grain size distribution is 8 or more. The inclination of the accumulated grain size distribution can be defined as an inclination (=1/(log D80–log D20)) between D20 and D80 in a case where the accumulated grain size distribution is plotted in a logarithmic manner.

As a co-material, ceramic grains are added to the metal conductive paste. A main component ceramic of the ceramic grains is not limited. However, it is preferable that a main component ceramic of the co-material is the same as that of the dielectric layer 11. For example, barium titanate may be evenly dispersed. For example, ceramic grains of which an average grain diameter is 10 nm or less are used as the co-material. The standard deviation of the grain diameter is 5 or less. Thus, sharp grain size distribution is achieved. It is preferable that the average grain diameter is 15 nm or less. It is more preferable that the average grain diameter is 10 nm or less. It is preferable that the standard deviation of the grain diameter is 5 or less. It is more preferable that the standard deviation of the grain diameter is 3 or less. It is preferable that the inclination of the accumulated grain size distribution is 7 or more. The inclination of the accumulated grain size distribution can be defined as an inclination (=1/(log D80–log D20)) between D20 and D80 in a case where the accumulated grain size distribution is plotted in a logarithmic manner. Moreover, it is preferable that the added amount of the co-material is 2.5 weight part or more and 25 weight part or less with respect to 100 weight part of the metal material. It is more preferable that the added amount of the co-material is 5 weight part or more and 20 weight part or less. This is because the amount of the co-material is not sufficient, the continuity modulus of the internal electrode layer 12 may be reduced and the arithmetic average roughness Ra and the maximum height Rz of the internal electrode layer 12 may be degraded, when the added amount of the co-material is less than 5 weight part. On the other hand, the amount of the co-material is excessively large, the continuity modulus of the internal electrode layer 12 may be reduced and the arithmetic average roughness Ra and the maximum height Rz of the internal electrode layer 12 may be degraded when the added amount of the co-material is more than 20 weight part.

Then, the dielectric green sheet on which the internal electrode layer pattern is printed is stamped into a predetermined size, and a predetermined number (for example, 100 to 500) of stamped dielectric green sheets are stacked while the base material is peeled so that the internal electrode layers 12 and the dielectric layers 11 are alternated with each other and the end edges of the internal electrode layers 12 are alternately exposed to both edge faces in the length direction of the dielectric layer so as to be alternately led out to a pair of external electrodes of different polarizations. Cover sheets, which are to be the cover layers 13, are compressed on the stacked dielectric green sheets and under the stacked dielectric green sheets. The resulting multilayer structure is cut into a predetermined size (for example, 1.0 mm×0.5 mm). After that, a metal conductive paste, which is to be the ground layer of the external electrodes 20a and 20b is coated on the both edge faces of the resulting multilayer structure and is dried. Thus, a compact of the multilayer ceramic capacitor 100 is obtained.

(Firing process) Next, after removing the binder in $N_2$ atmosphere at 250 degrees C. to 500 degrees C., the resulting compact is fired for ten minutes to 2 hours in a reductive atmosphere, of which an oxygen partial pressure is $10^{-5}$ to $10^{-8}$ atm, in a temperature range of 1100 degrees C. to 1300 degrees C. Thus, each compound structuring the dielectric green sheet is sintered and grains of each compound grow (each compound is densified). In this manner, the multilayer ceramic capacitor 100 is obtained. It is possible to adjust the amount of the co-material left in the internal electrode layer 12 by adjusting the firing condition. In concrete, when a speed of temperature increasing in the firing process is enlarged, the main component metal is sintered before the co-material is extruded from the metal conductive paste. Therefore, the co-material tends to exist in the internal electrode layer 12. For example, it is preferable that the average speed of the temperature increasing from a room temperature to a maximum temperature in the firing process is 30 degrees C./minute or more in order to increase the amount of the co-material left in the internal electrode layer 12. And it is more preferable that the average speed of the temperature increasing is 45 degrees C./minute or more. When the average speed of the temperature increasing is excessive large, an organic component existing in the compact is not sufficiently removed. And a defect such as a crack may occur in the firing process. Alternatively, a difference between an inner sintering and an outer sintering in the compact causes insufficient condensing. Therefore, a defect such as reduction of the electrostatic capacity may occur. And so, it is preferable that the average speed of the temperature increasing is 80 degrees C./minute or less. It is more preferable that the average speed of the temperature increasing is 65 degrees C./minute or less.

(Re-oxidizing process) After that, a re-oxidizing process may be performed at 600 degrees C. to 1000 degrees C. in N₂ gas atmosphere. (Plating process) After that, metal layers such as Cu, Ni or Su are coated on the ground layers of the external electrodes 20a and 20b by a plating process.

With the manufacturing method of the multilayer ceramic capacitor in accordance with the embodiment, a small diameter material of which grain size distribution is sharp is used as the main component metal of the internal electrode layer 12 and the co-material. Therefore, highly distributed metal conductive paste is obtained. And, a partial mixing of a large diameter material is suppressed. When the highly distributed metal conductive paste is used, diffusion of the co-material into the dielectric layer 11 in the firing process is suppressed. And the degradation of the arithmetic average roughness Ra and the maximum height Rz of the internal electrode layer 12 is suppressed. In concrete, metal powder of which an average grain diameter is 100 nm or less and of which a standard deviation of grain size distribution is 15 or less is used as the main component metal. And ceramic powder of which an average grain diameter is less than 10 nm and of which a standard deviation of grain size distribution 5 or less is used as the co-material. Moreover, the added amount of the co-material to the 100 weight part of the metal powder is 2.5 weight part or more and 25 weight part or less.

When enlargement of the arithmetic average roughness Ra and the maximum height Rz of the internal electrode layer 12 is suppressed, the dispersion of the co-material into the dielectric layer 11 is suppressed. And the multilayer ceramic capacitor 100, in which the continuity modulus of the internal electrode layer 12 is high and the unevenness of the thickness of the internal electrode layer 12 is suppressed, is obtained. Thus, the flocculation of the liquid phase into the interface between the dielectric layer 11 and the internal electrode layer 12 is suppressed. Therefore, the degradation of the reliability is suppressed. And it is possible to achieve the desirable characteristic.

EXAMPLES

The multilayer ceramic capacitors in accordance with the embodiment were made and the property was measured.

(Examples 1 to 5) A necessary additive compound was added to barium titanate powder of which an average grain diameter was 100 nm (a specific surface area of 10 m²/g). The resulting barium titanate powder was sufficiently wet-blended and crushed with a ball mil. Thus, the dielectric material was obtained. An organic binder and a solvent were added to the dielectric material. And dielectric green sheets were made by a doctor blade method. A thickness of the dielectric green sheet was 0.8 μm. The organic binder was polyvinyl butyral (PVB) resin or the like. The solvent was ethanol, toluene or the like. And a plasticizer and so on were added.

Next, the conductive paste for forming the internal electrode layer was formed by a planetary boll mill. The conductive paste included a main component metal (Ni) powder of the internal electrode layer 12 (50 wt % of Ni solid content), a co-material (barium titanate), 5 weight part of binder (ethyl cellulose), a solvent and an auxiliary as needed. As shown in FIG. 3, the average grain diameter of the main component metal powder was 70 nm (a specific surface area was 10 m²/g). The standard deviation of the grain diameter of the main component metal powder was 12. The inclination of the accumulated grain size distribution was 8. The average grain diameter of the co-material was 8.6 nm. The standard deviation of the grain diameter of the co-material was 2.7. The inclination of the accumulated grain size distribution of the co-material was 7. With respect to 100 weight part of the main component metal, the added amount of the co-material was 2.5 weight part in the example 1, 5 weight part in the example 2, 10 weight part in the example 3, 20 weight part in the example 4 and 25 weight part in the example 5.

The conductive paste for forming the internal electrode layer was screen-printed on the dielectric green sheet. 250 of the dielectric green sheets on which the conductive paste for forming the internal electrode layer was printed were stacked, and cover sheets were stacked on the stacked dielectric green sheets and under the stacked dielectric green sheets. After that, a ceramic multilayer structure was obtained by a thermal compressing. And the ceramic multilayer structure was cut into a predetermined size.

The binder was removed from the ceramic multilayer structure in N₂ atmosphere. After that, the metal paste including the metal filler of which a main component was Ni, the co-material, the binder and the solvent was coated from the both edge faces to the side faces of the ceramic multilayer structure and was dried. After that, the resulting multilayer structure was fired together with the metal paste for 10 minutes to 2 hours in a reductive atmosphere in a temperature range of 1100 degrees C. to 1300 degrees C. And, a sintered structure was formed. The average speed of temperature increasing from a room temperature to a maximum temperature was 55 degrees C./minute in the examples 1 to 5.

The resulting sintered structure had a length of 1.0 mm, a width of 0.5 mm and a height of 0.5 mm. The sintered structure was subjected to a re-oxidation process at 800 degrees C. in N₂ atmosphere. After that, by a plating process, a Cu-plated layer, a Ni-plated layer and a Sn-plated layer were formed on a surface of a ground layer. And, the multilayer ceramic capacitor 100 was obtained. The average thickness of the internal electrode layer 12 of the multilayer ceramic capacitor 100 was 0.3 μm.

(Comparative Examples 1 to 10) In comparative examples 1 to 5, as shown in FIG. 3, an average grain diameter of a main component metal powder (Ni) of the conductive paste for forming the internal electrode layer was 70 nm. A standard deviation of the grain diameters of the powder was 12. An inclination of accumulated grain size distribution of the powder was 8. An average grain diameter of a co-material was 29 nm. A standard deviation of the grain diameters of the co-material was 8.7. An inclination of accumulated grain size distribution of the co-material was 5. The added amount of the co-material was 2.5 weight part in the comparative example 1, 5 weight part in the comparative example 2, 10 weight part in the comparative example 3, 20 weight part in the comparative example 4, and 25 weight part in the comparative example 5.

In comparative examples 6 to 10, as shown in FIG. 3, an average grain diameter of a main component metal powder (Ni) of the conductive paste for forming the internal electrode layer was 120 nm. A standard deviation of the grain diameters of the powder was 33. An inclination of accumulated grain size distribution of the powder was 6. An average grain diameter of a co-material was 29 nm. A standard deviation of the grain diameters of the co-material was 8.7. An inclination of accumulated grain size distribution of the co-material was 5. The added amount of the co-material was 2.5 weight part in the comparative example 6, 5 weight part in the comparative example 7, 10 weight part in the comparative example 8, 20 weight part in the comparative example 9, and 25 weight part in the comparative example 10. Other conditions were the same as those of the examples 1 to 5.

Figure 4A:
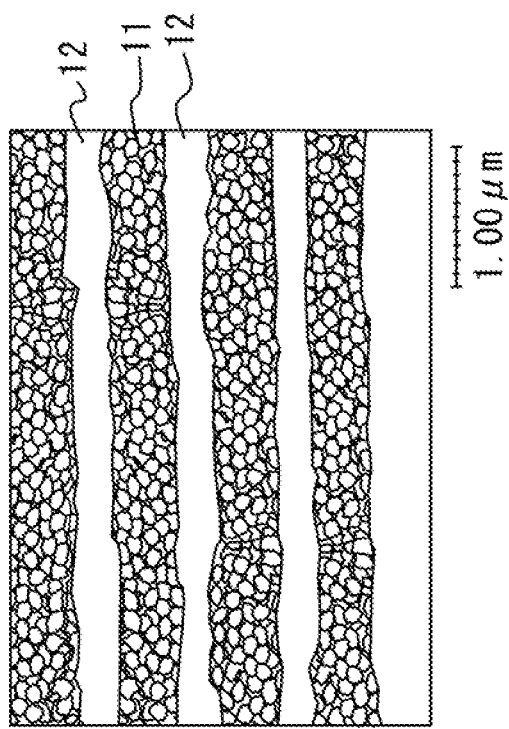
FIG. 4A to FIG. 4D illustrate SEM images of cross sections of a dielectric layer and an internal electrode layer in a stacking direction.
Figure 4B:
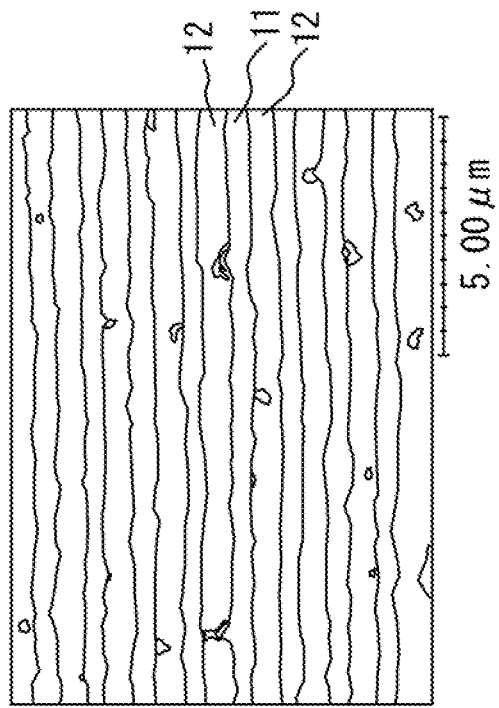
Figure 4C:
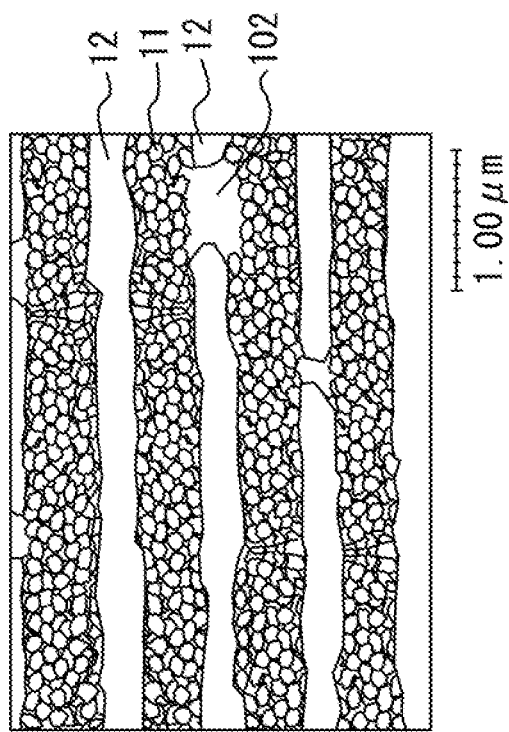
Figure 4D:
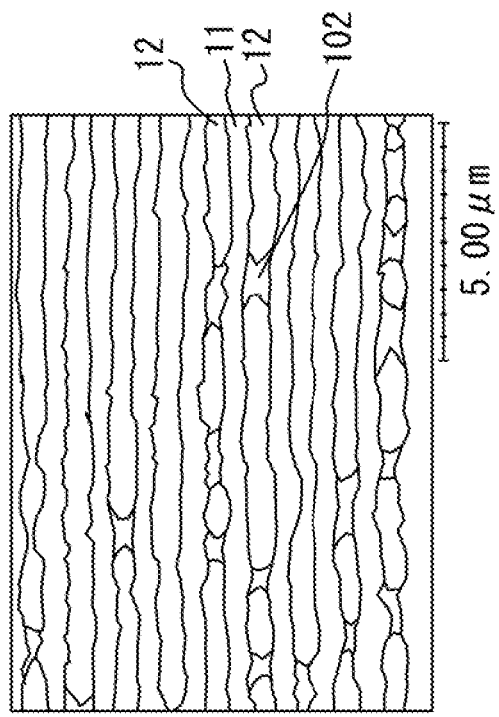

(Analysis) FIG. 4A to FIG. 4D illustrate SEM (Scanning Electron Microscope) images of cross sections of the dielectric layer 11 and the internal electrode layer 12 in the stacking direction in a center portion of the multilayer ceramic capacitor 100 in a width direction and a height direction. FIG. 4A illustrates a SEM image of the comparative example 3 in a case where the firing temperature of the ceramic multilayer structure was 900 degrees C. FIG. 4B illustrates a SEM image of the comparative example 3 in a case where the firing temperature of the ceramic multilayer structure was 1250 degrees C. FIG. 4C illustrates a SEM image of the example 3 in a case where firing temperature of the ceramic multilayer structure was 900 degrees C. FIG. 4D illustrates a SEM image of the example 3 in a case where the firing temperature of the ceramic multilayer structure was 1250 degrees C. From the results of FIG. 4B to FIG. 4D, the arithmetic average roughness Ra and the maximum height Rz of the internal electrode layer 12 in the stacking direction of the dielectric layer 11 and the internal electrode layer 12 were measured. In a region 102 in which the internal electrode layer 12 was broken, a height of the internal electrode layer 12 was considered as the maximum height Rz.

As illustrated in FIG. 5, it was confirmed that the arithmetic average roughness Ra and the maximum height Rz were 28 [nm] and 357 [nm] in the example 1, 25 [nm] and 148 [nm] in the example 2, 22 [nm] and 134 [nm] in the example 3, 21 [nm] and 122 [nm] in the example 4, 27 [nm] and 327 [nm] in the example 5. And it was confirmed that the arithmetic average roughness Ra and the maximum height Rz were 37 [nm] and 612 [nm] in the comparative example 1, 32 [nm] and 554 [nm] in the comparative example 2, 32 [nm] and 542 [nm] in the comparative example 3, 31 [nm] and 533 [nm] in the comparative example 4, 36 [nm] and 587 [nm] in the comparative example 5, 46 [nm] and 775 [nm] in the comparative example 6, 42 [nm] and 712 [nm] in the comparative example 7, 41 [nm] and 720 [nm] in the comparative example 8, 41 [nm] and 713 [nm] in the comparative example 9, 43 [nm] and 743 [nm] in the comparative example 10.

The reason why the arithmetic average roughness Ra and the maximum height Rz of the internal electrode layer 12 of the comparative examples 1 to 5 smaller than those of the comparative examples 6 to 10 and the arithmetic average roughness Ra and the maximum height Rz of the internal electrode layer 12 of the examples 1 to 5 were smaller than those of the comparative examples 1 to 5 is thought as follows.

Figure 6B:
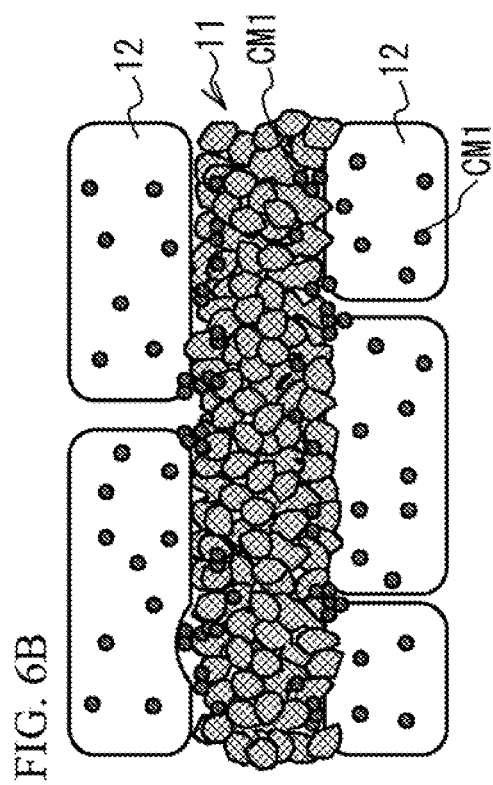
FIG. 6A to FIG. 6D illustrate conditions of dielectric layers and internal electrode layers from after removing of a binder to after densifying, in a comparative example 8.
Figure 6D:
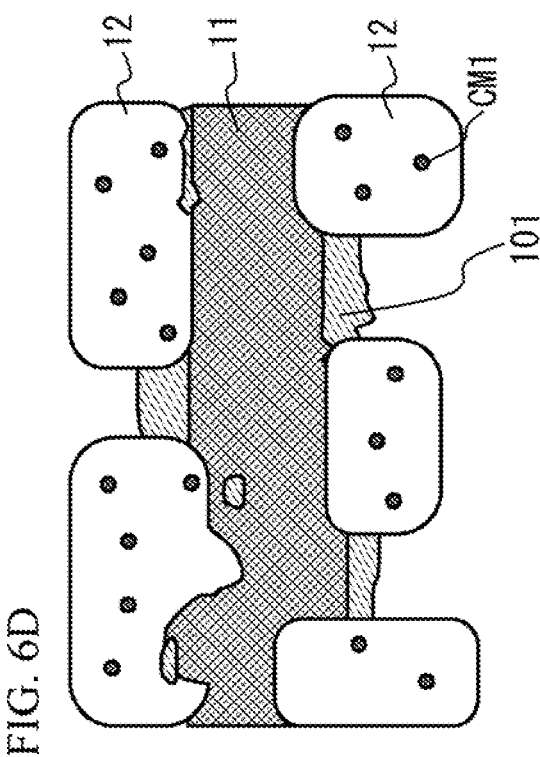
Figure 6A:
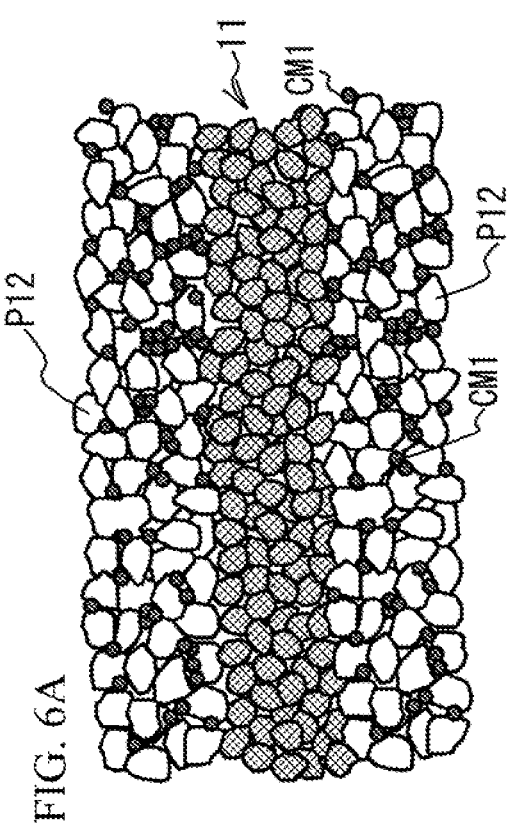
Figure 6C:
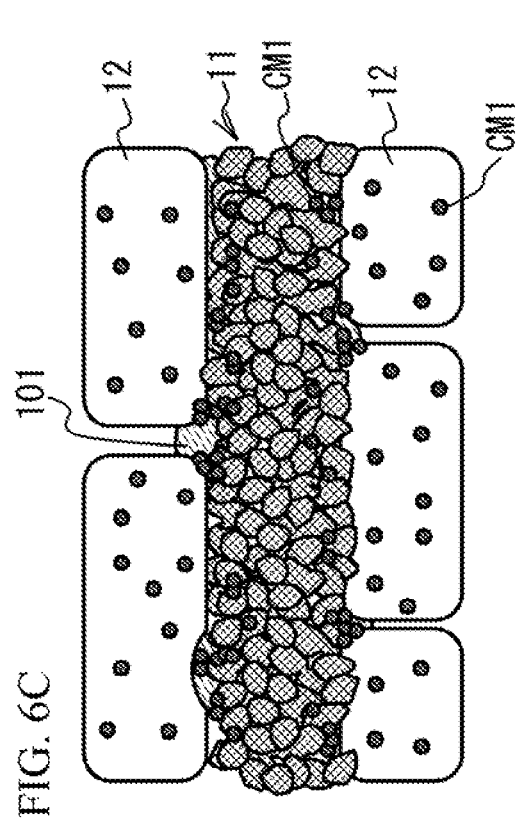

For example, in the comparative example 8, the average grain diameter of the main component metal (Ni) was 120 nm. Therefore, after the removing of the binder, as illustrated in FIG. 6A, the co-material CM1 tended to be exist in a cavity between the grains P12 of the main component metal. And, a part of the co-material CM1 was flocculated. When the temperature of the firing process was approximately 800 degrees C., the co-material CM1 was diffused toward the dielectric layer 11 from between the grains P12 of the main component metal. Thereby, the surface roughness of the internal electrode layer 12 was enlarged. In this case, a liquid phase 101 tended to be left in a region (cavity), of which the surface roughness was large, in the internal electrode layer 12, as illustrated in FIG. 6C. When the temperature increased to the maximum temperature (for example, 1250 degrees C.), liquid flocculation occurred as illustrated in FIG. 6D. It is thought that the surface roughness of the internal electrode layer 12 was enlarge more.

For example, in the comparative example 3, the average grain diameter (70 nm) of the main component metal (Ni) was smaller than that of the comparative example 8. Therefore, as illustrated in FIG. 7A, the number of the cavity was small. However, the co-material CM1 existed in the cavity. And a part of the co-material CM1 was flocculated. When the temperature became 800 degrees C. in the firing process, the flocculated co-material CM1 was diffused and the surface roughness of the internal electrode layer 12 was degraded as illustrated in FIG. 7B, although the average grain diameter of the main component metal was small and the clearance between the grains P12 of the main component metal was small. And during the liquid phase diffusion in a temperature ranges of 900 degrees C. to 1000 degrees C., the liquid phase 101 tended to exist in a region (cavity), of which the surface roughness was large, in the internal electrode layer 12, as illustrated in FIG. 7C. When the temperature increased to the maximum temperature (for example, 1250 degrees C.), liquid flocculation occurred as illustrated in FIG. 7D. It is thought that the surface roughness of the internal electrode layer 12 was enlarged more.

Figure 8A:
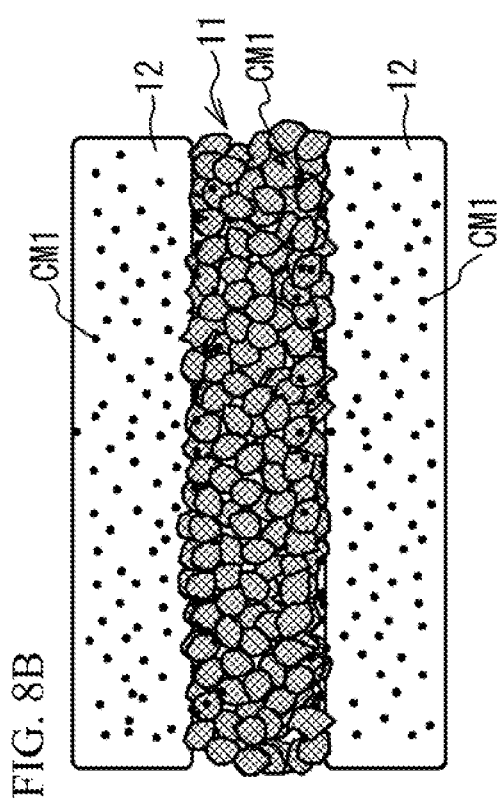
FIG. 8A to FIG. 8D illustrate conditions of dielectric layers and internal electrode layers from after removing of a binder to after densifying, in an example 3.
Figure 8B:
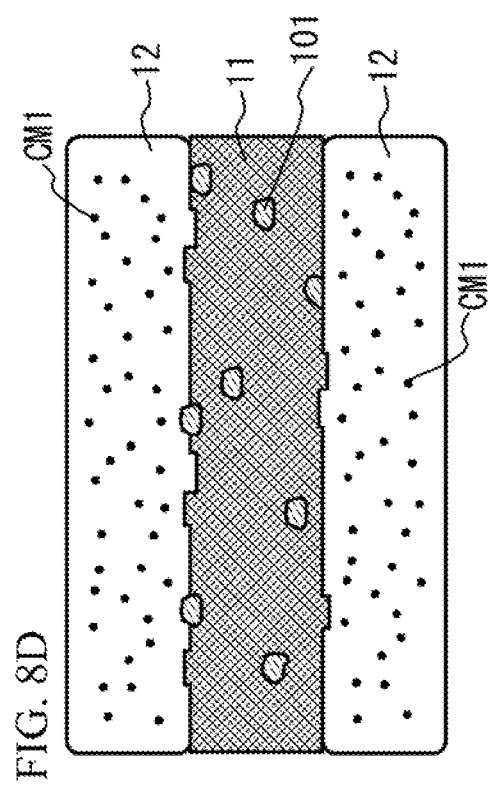
Figure 8C:
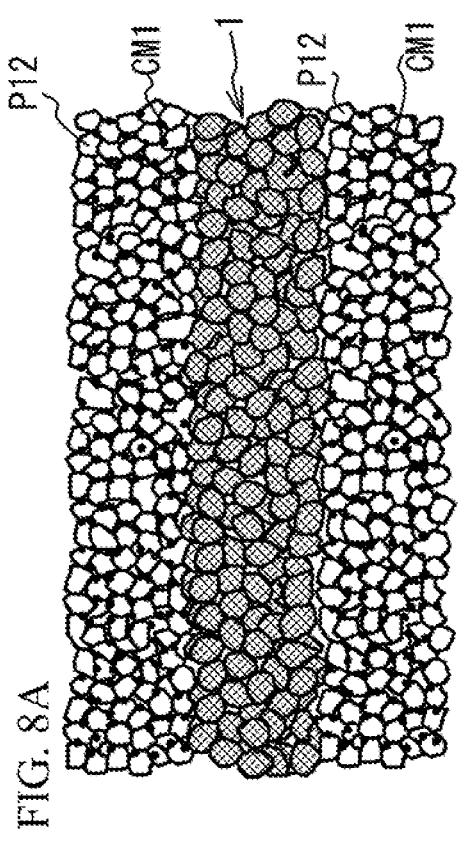
Figure 8D:
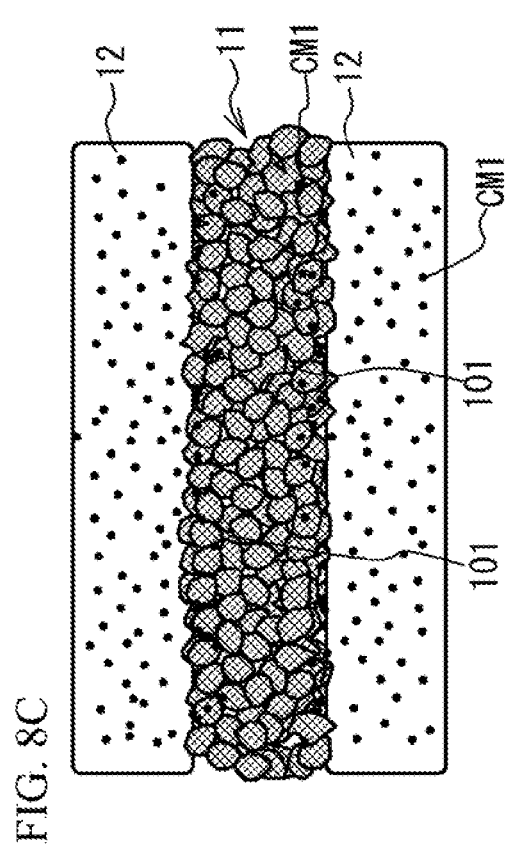

On the other hand, in the example 3, as the main component metal, small diameter material of which the grain size distribution was sharp was used. And as the co-material, small diameter material of which the grain size distribution was sharp was used. Therefore, the highly distributed metal conductive paste was made. Accordingly, as illustrated in FIG. 8A, the co-material CM1 evenly existed between the grains 12 of the main component metal. The co-material CM1 can be highly distributed and had a small diameter. Therefore, a mutual function between the co-material CM1 and the main component metal was strong. Even if the temperature became 800 degrees C. in the firing process, the diffusion of the co-material was suppressed as illustrated in FIG. 8B. Therefore, the enlargement of the surface roughness of the internal electrode layer 12 was suppressed. Moreover, in the temperature range of 900 degrees C. to 1000 degrees C., the liquid phase 101 was relatively and evenly flocculated into the dielectric layer 11 or into the interface between the dielectric layer 11 and the internal electrode layer 12 as illustrated in FIG. 8C. Therefore, as illustrated in FIG. 8D, after the temperature reached the maximum temperature, it is thought that the internal electrode layer 12 could keep the surface roughness.

It is thought that the reason why the arithmetic average roughness Ra and the maximum height Rz of the internal electrode layer 12 of the examples 2 to 4 were smaller than those of the examples 1 and 5 is as follows. When the added amount of the co-material was less than 5 weight part, the amount of the co-material was not sufficient and the continuity modulus of the internal electrode layer 12 was reduced. Thereby, the arithmetic average roughness Ra and the maximum height Rz were degraded. On the other hand, when the added amount of the co-material was more than 20 weight part, the amount of the co-material was excessively large and the continuity of the internal electrode layer 12 was reduced. Thereby, the arithmetic average roughness Ra and the maximum height Rz were enlarged.

Next, a capacity, a breakdown voltage (BDV) and high temperature accelerated life time (HALT) were measured with respect to the multilayer ceramic capacitors 100 of the examples and the comparative examples. FIG. 5 illustrates the results of the capacity, the breakdown voltage (BDV) and the high temperature accelerated life time (HALT). The BDV was measured by applying DC voltage with a speed of 10V/second. The HALT was measured with 125 degrees C.-10V.

In FIG. 5, any one of the examples 1 to 5 satisfied an acceptance criteria, when the acceptance criteria was that the capacity of a sample was 19 [μF] or more, the BDV was 38 [V] or more, and the HALT was 300 [min] or more. However, the comparative examples 1 to 10 did not satisfy the acceptance criteria. This was because the arithmetic average roughness Ra of the internal electrode layer 12 was 30 nm or less and the maximum height Rz of the internal electrode layer 12 was 360 nm or less in the examples 1 to 5, and the arithmetic roughness Ra of the internal electrode layer 12 was not 30 nm or less or the maximum height Rz of the internal electrode layer 12 was not 360 nm or less in the comparative examples 1 to 10.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
   a multilayer structure in which each of a plurality of dielectric layers and each of a plurality of internal electrode layers are alternately stacked, a main component of the dielectric layers being ceramic, a main component of the internal electrode layer being a metal,
   wherein an arithmetic average roughness Ra of at least a part of the internal electrode layer is 30 nm or less,
   wherein a maximum height Rz of the at least a part of the internal electrode layer is 360 nm or less.

2. The multilayer ceramic capacitor as claimed in claim 1, wherein:
   the arithmetic average roughness Ra of the at least a part of the internal electrode layer is 25 nm or less; and
   the maximum height Rz of the at least a part of the internal electrode layer is 150 nm or less.

3. The multilayer ceramic capacitor as claimed in claim 1, wherein the main component metal of the internal electrode layer is nickel.

4. The multilayer ceramic capacitor as claimed in claim 1, wherein the main component ceramic of the dielectric layer is barium titanate.

5. The multilayer ceramic capacitor as claimed in claim 1, wherein a thickness of the internal electrode layer is 0.5 μm or less.

6. A manufacturing method of a multilayer ceramic capacitor comprising:
   a first step of forming a pattern of a metal conductive paste on a green sheet including ceramic powder, a main component of the metal conductive paste being metal powder of which an average grain diameter is 100 nm or less and of which a standard deviation of grain size distribution is 15 or less, the metal conductive paste including ceramic powder as a co-material, an average grain diameter of the co-material being less than 10 nm, a standard deviation of grain size distribution of the co-material being 5 or less, an amount of the co-material being 2.5 weight part or more and 25 weight part or less with respect to 100 weight part of the metal powder; and
   a second step of firing a ceramic multilayer structure in which a plurality of multilayer units obtained in the first step are stacked,
   wherein an arithmetic average roughness Ra of at least a part of an internal electrode formed by sintering of the metal powder in the second step is 30 nm or less,
   wherein a maximum height Rz of the at least a part of the internal electrode layer is 360 nm or less.

7. The method as claimed in claim 6, wherein:
   the arithmetic average roughness Ra of the at least a part of the internal electrode layer is 25 nm or less; and
   the maximum height Rz of the at least a part of the internal electrode layer is 150 nm or less.

8. The method as claimed in claim 6, wherein the metal conductive paste includes ceramic powder of which an average grain diameter is less than 10 nm and of which a standard deviation is 5 or less, as a co-material, an amount of the co-material being 5 weight part or more and 20 weight part or less with respect to 100 weight part of the metal powder.

9. The method as claimed in claim 6, wherein a main component of the metal powder is nickel.

10. The method as claimed in claim 6, wherein a main component of the co-materials is barium titanate.

11. The method as claimed in claim 6, wherein a main component of the ceramic powder of the green sheet is barium titanate.

* * * * *